No. 775,919. Patented November 29, 1904.

UNITED STATES PATENT OFFICE.

WILLIAM A. HALL, OF BELLOWS FALLS, VERMONT.

PAINT COMPOSITION.

SPECIFICATION forming part of Letters Patent No. 775,919, dated November 29, 1904.

Application filed March 24, 1904. Serial No. 199,817. (No specimens.)

*To all whom it may concern:*

Be it known that I, WILLIAM A. HALL, a citizen of the United States, residing at Bellows Falls, in the county of Windham and State of Vermont, have invented or discovered certain new and useful Improvements in Paint Compositions, of which the following is a specification.

This invention or discovery relates to that class of water-paints now very largely in use owing to their cheapness and which are more or less waterproof or water-resisting, so as to withstand exposure to the weather, and the invention or discovery has for its object to improve the said class of paints by giving them a more elastic and more water-resisting character, so that they will be less inclined to crack and peel and will be more durable when exposed to the weather.

The present invention or discovery comprises an improvement on the paint composition embraced by my United States application, Serial No. 174,473, filed September 24, 1903, as will be hereinafter explained.

The new paint composition comprises a binder or binding composition consisting of about twenty parts of animal glue or casein, (preferably casein,) one part ammonia, one hundred and seventy parts water, two and one-half parts formaldehyde, two parts boracic acid, and one part creosote. If glue be used instead of casein, then no ammonia or other alkali is necessary. These stated portions of the binder or binding composition may be varied somewhat, and the formaldehyde, boracic acid, and creosote may each or all be omitted, if desired, although it is better to use them. The formaldehyde has a waterproofing tendency and also a preservative effect, and the creosote acts as a preservative to prevent decomposition. The formaldehyde being acid in reaction produces a slightly-acid solution.

The new paint composition is formed by mixing about one hundred parts of the binding composition or solution just above described with about two hundred parts of a powdered mineral or earthy base, as whiting or talc, (preferably talc,) twenty-five parts of corn-oil extracted from Indian corn or maize, two parts potassium oxalate, and fifty parts of water, in a portion of which latter the potassium oxalate may have been previously dissolved.

In making the paint composition the binding composition or solution above described will first be well mixed with the talc or other mineral base employed, and the corn-oil will then be thoroughly mixed with the talc and binding composition before adding the dissolved potassium oxalate and water. The casein or other animal glutinous adhesive employed in the binder or binding composition will prevent frothing when the talc is combined with the oily composition.

The corn-oil used in this new paint composition is a non-oxidizing oil and renders the the paint when applied to the surfaces to be coated tough and elastic when dry, as well as waterproof or water-resisting, so that it will not discolor or turn dark when wet, as is the case with all water-paints heretofore in use, so far as is known, while the present improved paint containing a small proportion of corn-oil has the same characteristics when in use and exposed to the weather as a full or regular oil-paint and will not become discolored by being wet.

An ammoniacal solution of casein does not produce a waterproof binder for a water-paint, even though it may contain a small percentage of formaldehyde, and where glue is used in place of the casein solution in the water-paint of course such paint would not be waterproof at all, and hence the waterproofing effect must come entirely from the corn-oil employed in the paint composition, and the purpose of the adhesive or binding composition comprising the casein or animal glue is simply to prevent frothing and saponification, and thus produce a paint which will spread or flow properly.

Having thus described my invention or discovery, what I claim is—

1. A paint composition comprising a mineral base, as talc or whiting, corn-oil, water, and a binding composition including an animal adhesive which will combine with the oil, water and base to prevent frothing and enable the paint to flow or spread readily.

2. A paint composition comprising a mineral base, corn-oil, casein, potassium oxalate and water.

3. A paint composition comprising a mineral base, corn-oil, casein, potassium oxalate, boracic acid, creosote, and water.

In testimony whereof I affix my signature in presence of two witnesses.

WILLIAM A. HALL.

Witnesses:
P. S. COURTS,
H. L. DERBY.